Sept. 27, 1966  M. G. LEONARD  3,275,900
CAPACITOR-TRANSFORMER COMBINATION
Filed May 3, 1963  2 Sheets-Sheet 1
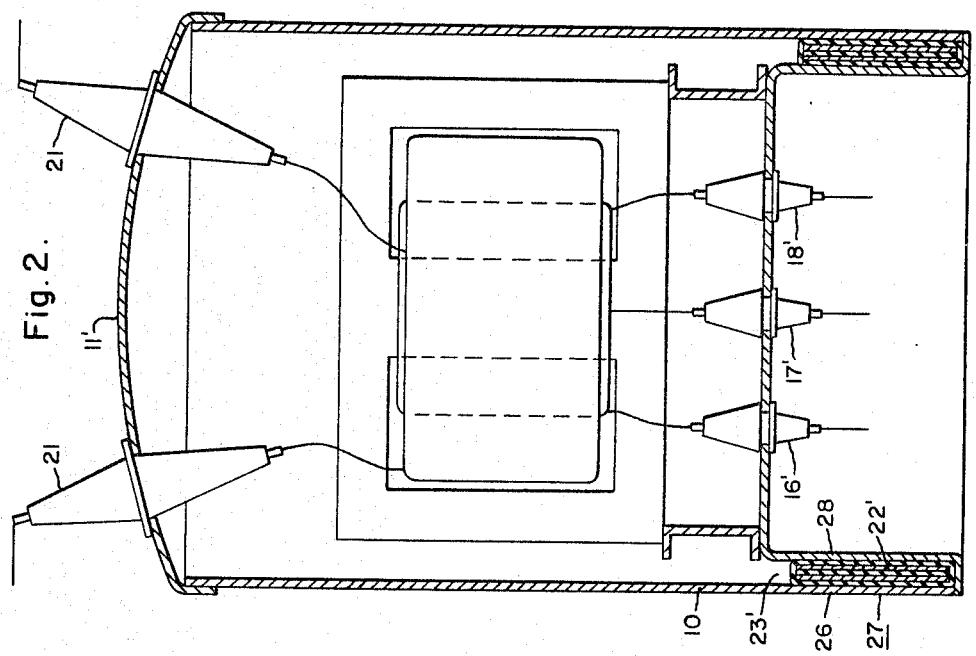
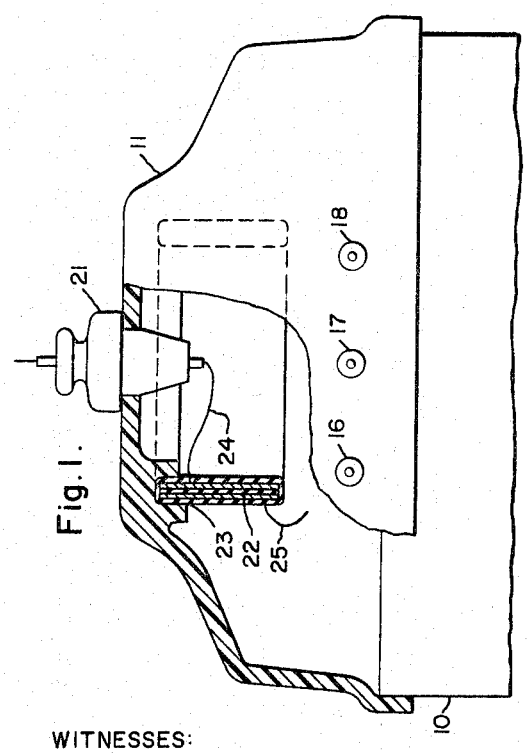
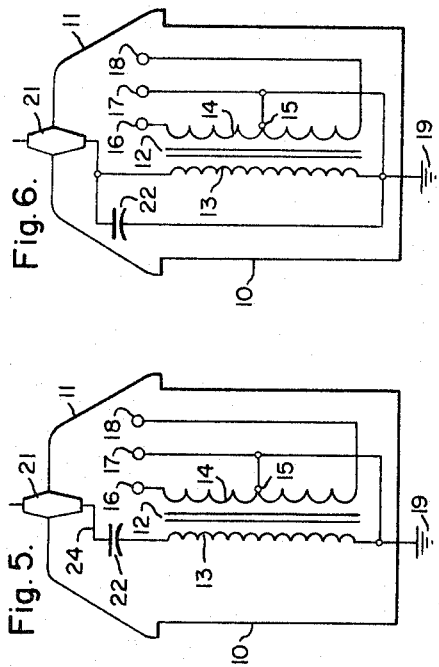
WITNESSES:
Bernard R. Giguay
James F. Young
INVENTOR
Merrill G. Leonard
BY F. E. Browder
ATTORNEY Sept. 27, 1966        M. G. LEONARD        3,275,900
CAPACITOR-TRANSFORMER COMBINATION
Filed May 3, 1963                              2 Sheets-Sheet 2
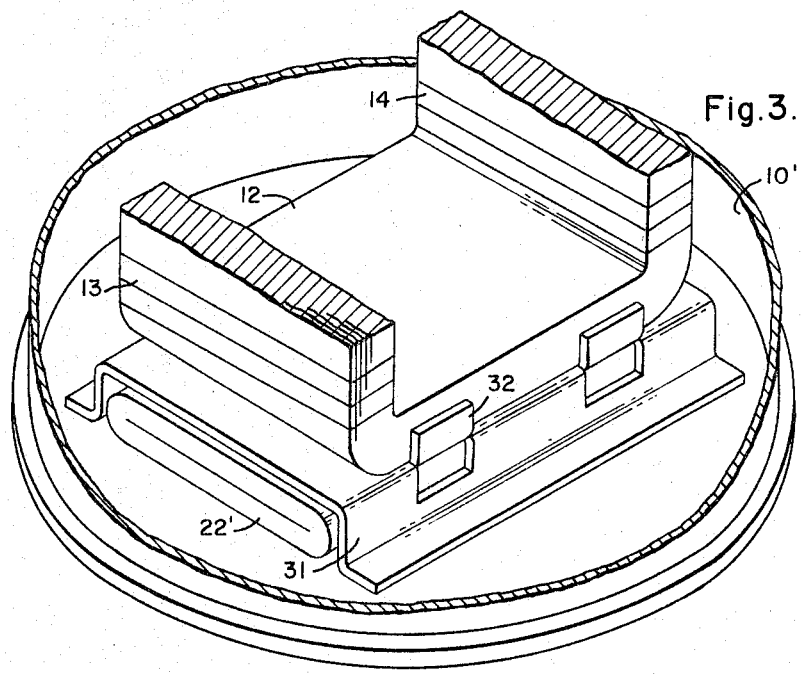
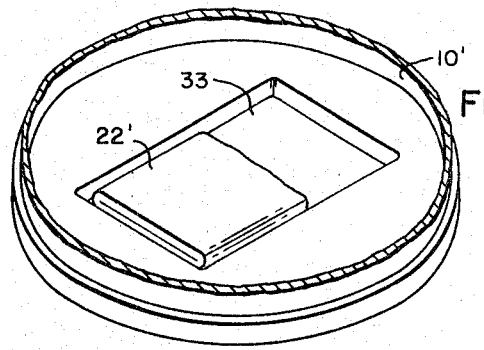
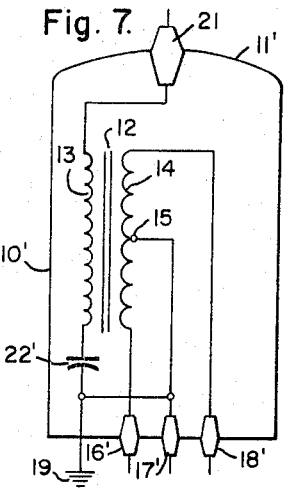
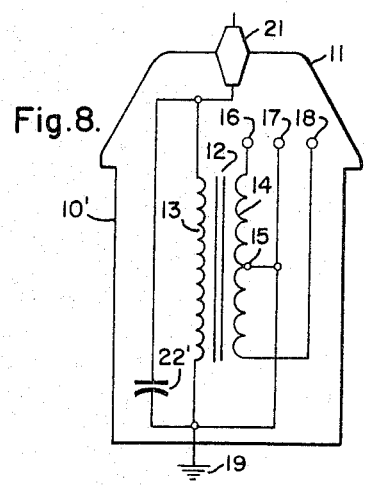

United States Patent Office 3,275,900
Patented Sept. 27, 1966

3,275,900
CAPACITOR-TRANSFORMER COMBINATION
Merrill G. Leonard, Brookfield Township, Trumbull County, Ohio, assignor to Westinghouse Electric Corporation, East Pittsburgh, Pa., a corporation of Pennsylvania
Filed May 3, 1963, Ser. No. 277,945
3 Claims. (Cl. 317—157.62)

This invention relates, generally, to electrical apparatus and, more particularly, to a combined capacitor and transformer structure.

The voltage drop across the effective impedance of a transformer in an electrical distribution system and the voltage drop across the feeder lines associated with the transformer adversely affect the voltage regulation of the distribution system. Also, the exciting current of the transformer adds to the lagging power factor reactive load on the distribution system, thereby reducing the useful load-carrying ability of the system and increasing the required generating capacity of the system.

One method of overcoming the foregoing disadvantages is to provide capacitors which are connected in the system externally of the transformer and are mounted separately from the transformer. This requires additional space and the providing of means for mounting and connecting the capacitors externally of the transformer.

Other methods are described in a copending application, Serial No. 745,555, filed June 30, 1958, by A. M. Lockie, now abandoned and in a copending application, Serial No. 786,468, filed January 13, 1959, by H. W. Book, now abandoned, which are assigned to the same assignee as this application. In the Lockie application a winding construction is disclosed which provides a predetermined capacitance between the adjacent turns of the different windings of a transformer with the capacitance being effectively connected in parallel with one of the associated windings. In the Book application a predetermined capacitance is provided between the different windings of a transformer and effectively connected in series with one of the windings of the transformer. Transformers constructed as described in the aforesaid applications have improved operating characteristics, but they are relatively high in cost.

An object of this invention is to provide a transformer having the advantages of a transformer which has capacitance between its windings, but can be built more economically than one of the aforesaid transformers.

Another object of the invention is to provide a combined capacitor and transformer structure.

A further object of the invention is to provide for mounting a capacitor inside the enclosure for a transformer with only a small increase in the size of the enclosure.

Still another object of the invention is to provide a desirable shape, mechanical protection, and relatively low ambient temperature for a capacitor utilized in conjunction with a transformer.

A still further object of the invention is to utilize the cover of a transformer enclosure for supporting and insulating a capacitor and the terminals for the windings of the transformer.

Another object of the invention is to provide mechanical protection for terminal bushings of a transformer.

Other objects of the invention will be explained fully hereinafter or will be apparent to those skilled in the art.

In accordance with the invention a capacitor is mounted within the confines of a transformer enclosure including a tank and its cover which contain a core and windings disposed on the core. The capacitor may be connected internally of the enclosure in either series or parallel circuit relation with one of the transformer windings to obtain the desired operating characteristics.

For a better understanding of the nature and objects of the invention, reference may be had to the following detailed description taken in conjunction with the accompanying drawings in which:

FIGURE 1 is a view, partly in section and partly in elevation, of a potion of a transformer having a capacitor mounted in the cover for the transformer tank;

FIG. 2 is a view of a transformer having a capacitor mounted at the bottom of the tank;

FIGS. 3 and 4 are views, in perspective, showing portions of two other transformers each having a capacitor mounted at the bottom of the tank; and FIGS. 5-8, inclusive, are diagrammatic views showing different ways of connecting the capacitor in circuit relation with the transformer windings.

Referring to the drawings, and particularly to FIG. 1, the structure shown therein comprises a portion of the transformer tank 10 having a removable cover 11. The tank 10 may be of the usual type for a distribution transformer containing a transformer core 12, a primary winding 13 and a secondary winding 14 on the core as shown diagrammatically in FIG. 5. The secondary 14 may have a mid tap 15, thereby supplying a three-wire load distribution circuit which may be connected to terminal members 16, 17 and 18. The mid tap 15 may be connected to ground at 19.

The cover 11 is preferably molded from a suitable insulating material, such as a glass polyester resin. As shown in FIG. 1, the low tension terminals 16, 17 and 18 are mounted in the cover 11. A high tension terminal 21 is also mounted in the cover 11. The terminal 21 may be connected to one terminal of an alternating current power source (not shown), the other terminal of which may be connected to ground, thereby energizing the primary winding 13 one end of which is connected to ground at 19 and the other end is connected to the terminal 21 in series circuit relation with a capacitor 22 as shown in FIG. 5.

As explained hereinbefore, the voltage regulation and the power factor of a distribution system may be improved by providing capacitors which are connected in the system externally of the transformer and are mounted separately from the transformer. However, this requires additional space and additional means for mounting and connecting the capacitor externally of the transformer.

In order to save space and simplify the mounting and the connecting of a capacitor in a distribtuion system, this invention provides for mounting the capacitor within the confines of the transformer enclosure including the tank 10 and the cover 11. As shown in FIG. 1, a generally annular recess 23 is provided in the cover 11 around the high tension terminal 21, but spaced from the terminal 21. The capacitor 22 may be generally annular in shape and disposed in the recess 23. The connections to the capacitor may be made by conductors 24 and 25 which extend from the terminal 21 and the primary winding 13, respectively, inside the tank. Thus, the cover serves to support and insulate the high voltage terminal 21 and the capacitor 22 as well as the low voltage terminals 16, 17 and 18.

As shown in FIG. 5, the capacitor 22 is so located that it may be readily connected in series circuit relation with the primary winding 13 at the high voltage end of the winding. As shown in FIG. 6, the capacitor 22 may be connected in parallel circuit relation with the winding 13 if desired.

In the transformer shown in FIG. 2 an annular recess 23' is provided between spaced circular walls 26 and 28 of a rim 27 around the bottom of the tank 10. The capacitor 22' is disposed in the recess 23' where it is protected mechanically and immersed in relatively low temperature oil contained in the tank. Low voltage bushings 16', 17' and 18', which extend through the bottom of the tank, may be mounted in the space surrounded by the rim 27 where they are protected mechanically. Thus, the rim 27 protects the capacitor 22' and the bushings 16', 17' and 18' from injury.

As shown in FIG. 7, the capacitor 22' is so located at the bottom of the tank 10' that it may be readily connected in series circuit relation with the winding 13 at the grounded end of the winding. The capacitor 22' may be connected in parallel circuit relation with the winding 13 as shown in FIG. 8.

The manner in which a shunt capacitance affects the operation of a transformer is fully described in the aforesaid copending application, Serial No. 745,555. Briefly, the leading power factor current drawn by the capacitance substantially cancels the magnetizing component of the exciting current, or the capacitance provided may be such as to draw a leading power factor current which is even larger than the magnetizing component of the exciting current. This means that even when the transformer is not connected to a load across the secondary winding the transformer and the capacitor may be constructed to draw a leading power factor no-load current. In the latter case, the leading power factor no-load current drawn by a transformer will offset the lagging power factor current being drawn elsewhere in a distribution system to thereby increase the overall efficiency of the distribution system.

The manner in which a series capacitance provided in a transformer affects the magnitude of the load voltage is described in the aforesaid copending application, Serial No. 786,468. Briefly, the effect of the voltage across the capacitance which is connected in series with the primary winding is to offset or cancel out at least a portion of the normally lagging power factor reactive voltage drop which occurs in the transformer and associated circuits. Thus, in a particular application, it may be desirable to provide a predetermined capacitance in a transformer such that the leading power factor reactance of said capacitance exceeds the normally lagging power factor reactance of a transformer alone or in combination with that of an associated feeder line. The present invention makes it possible to provide and install a capacitor with a transformer having the desired amount of capacitance for a particular transformer and its load conditions.

In the modification shown in FIG. 3, an inverted generally channel-shaped member 31 is mounted on the bottom of the tank 10' for supporting the core 12 and the windings 13 and 14, shown diagrammatically on the core. The core may be positioned on the inverted channel by upwardly turned portions 32 of the channel member. A generally flat capacitor 22' is disposed in the space or recess between the web of the channel 31 and the bottom of the tank 10'. Thus, the capacitor is protected mechanically and is immersed in the coolest portion of the oil in the transformer tank, which portion is at the bottom of the tank. The capacitor may be connected in either series or parallel circuit relation with the primary winding 13 in the manner hereinbefore described.

In the modified tank shown in FIG. 4, a generally flat capacitor 22' is disposed in a recess 33 formed in the bottom of the tank 10'. The transformer core and coils may be placed over the capacitor 22' since it is slightly beneath the surface of the bottom wall of the tank. The capacitor may be connected in either series or parallel circuit relation with the primary winding of the transformer as hereinbefore described.

From the foregoing description it is apparent that the invention provides a capacitor-transformer combination in which the capacitor is disposed within the confines of the enclosure for the transformer. The enclosure is not materially increased in size since the capacitor is disposed in space within the enclosure which is normally not utilized. Thus, there is little increase in cost, except for the capacitor, since no external mounting structure is required for the capacitor. Internal connections may be made between the capacitor and a transformer winding.

Since numerous changes may be made in the above-described construction, and different embodiments of the invention may be made without departing from the spirit and scope of the invention, it is intended that all the matter contained in the foregoing description or shown in the accompanying drawing shall be interpreted as illustrative and not in a limiting sense.

I claim as my invention:

1. A capacitor-transformer combination comprising an enclosure including a tank and a cover for the tank, a transformer core within the enclosure, transformer windings on the core, said tank having a generally annular recess at the bottom thereof, a generally annular capacitor disposed in said recess, and said capacitor being connected in circuit relation with one of said transformer windings.

2. In a transformer, in combination, an enclosure including a tank and a cover for the tank, a transformer core within the enclosure, transformer windings on the core, a generally annular rim at the bottom of the tank, a recess inside said rim, a generally annular capacitor disposed in said recess, said capacitor being connected in circuit relation with one of said windings, terminal bushings extending through the bottom of the tank, and said bushings being disposed within the space surrounded by said rim.

3. In a transformer, in combination, an enclosure including a tank and a cover for the tank, a transformer core within the enclosure, transformer windings on the core, a generally annular rim at the bottom of the tank, said rim having spaced circular walls forming a recess therebetween, a generally annular capacitor disposed in said recess, said capacitor being connected in circuit relation with one of said windings, terminal bushings extending through the bottom of the tank, and said rim surrounding said bushings to protect the bushings.

References Cited by the Examiner

UNITED STATES PATENTS

| 2,220,615 | 11/1940 | Pittman et al. | 336—92 X |
| 2,514,015 | 7/1950 | Sutter | 317—157.62 |
| 2,519,009 | 8/1950 | Wolfe | 336—90 X |
| 2,577,733 | 12/1951 | Bridges | 336—90 X |

FOREIGN PATENTS 42,622  11/1913  Sweden.

JOHN F. COUCH, *Primary Examiner.*

LLOYD McCOLLUM, *Examiner.*

W. E. RAY, *Assistant Examiner.*